(12) United States Patent
Amo et al.

(10) Patent No.: US 10,444,894 B2
(45) Date of Patent: Oct. 15, 2019

(54) DEVELOPING CONTEXTUAL INFORMATION FROM AN IMAGE

(71) Applicant: Hewlett-Packard Development Company, L.P., Houston, TX (US)

(72) Inventors: Immanuel Amo, Redwood City, CA (US); Diogo Lima, Newark, CA (US); Nicholas P Lyons, Palo Alto, CA (US); Arman Alimian, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/509,805

(22) PCT Filed: Sep. 12, 2014

(86) PCT No.: PCT/US2014/055392
§ 371 (c)(1),
(2) Date: Mar. 8, 2017

(87) PCT Pub. No.: WO2016/039769
PCT Pub. Date: Mar. 17, 2016

(65) Prior Publication Data
US 2017/0285850 A1    Oct. 5, 2017

(51) Int. Cl.
*G06F 3/041* (2006.01)
*G06F 3/01* (2006.01)
(Continued)

(52) U.S. Cl.
CPC ........... *G06F 3/0416* (2013.01); *G03B 17/54* (2013.01); *G06F 3/017* (2013.01); *G06F 3/0304* (2013.01);
(Continued)

(58) Field of Classification Search
CPC .............................. G06F 3/0416; G06F 3/0304
See application file for complete search history.

(56) References Cited

U.S. PATENT DOCUMENTS 5,511,148 A    4/1996    Wellner
7,599,561 B2   10/2009   Wilson et al.
(Continued)

FOREIGN PATENT DOCUMENTS

TW           201115252 A1      5/2011
WO       WO-2011-085023 A2    7/2011
(Continued)

OTHER PUBLICATIONS

Jeong et al., "Designing a PCA-based Collaborative Visual Analytics System," Sep. 16, 2009, pp. 1-4, vrissue.com/portfolio/pfd/COVIS09_Jeong_Final.pdf.
(Continued)

*Primary Examiner* — Liliana Cerullo
(74) *Attorney, Agent, or Firm* — HP Inc. Patent Department

(57) ABSTRACT

In an example implementation according to aspects of the present disclosure, a method may include capturing data entered on a touch sensitive mat or on an object physically disposed on the touch sensitive mat. The method further includes extracting the data from the captured image, and developing contextual information from the data extracted from the captured image. The method further includes projecting the contextual information onto the touch sensitive mat or onto the object.

15 Claims, 5 Drawing Sheets

(51) Int. Cl.
  *G06F 3/03*     (2006.01)
  *G03B 17/54*    (2006.01)
  *G06F 3/0484*   (2013.01)

(52) U.S. Cl.
  CPC ............ *G06F 3/041* (2013.01); *G06F 3/0484* (2013.01); *G03B 2206/00* (2013.01)

(56) References Cited

U.S. PATENT DOCUMENTS

| | | | |
|---|---|---|---|
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,736,583 B2 | 5/2014 | Anderson et al. | |
| 2003/0200078 A1 | 10/2003 | Luo | |
| 2003/0233224 A1* | 12/2003 | Marchisio | G06F 17/271 704/4 |
| 2005/0078092 A1 | 4/2005 | Clapper | |
| 2006/0234784 A1 | 10/2006 | Reinhorn | |
| 2008/0018591 A1 | 1/2008 | Pittel et al. | |
| 2008/0115080 A1* | 5/2008 | Matulic | G06F 17/30253 715/778 |
| 2008/0191864 A1 | 8/2008 | Wolfson | |
| 2011/0047459 A1 | 2/2011 | Van der Morkel | |
| 2011/0242054 A1 | 10/2011 | Tsu | |
| 2012/0042288 A1 | 2/2012 | Liao et al. | |
| 2013/0021281 A1 | 1/2013 | Tse et al. | |
| 2013/0077236 A1 | 3/2013 | Becze et al. | |
| 2013/0215148 A1 | 8/2013 | Antonyuk et al. | |
| 2013/0257748 A1 | 10/2013 | Ambrus et al. | |
| 2013/0329247 A1 | 12/2013 | Takabatake | |
| 2014/0125704 A1 | 5/2014 | Sievert | |
| 2014/0168267 A1 | 6/2014 | Kim et al. | |
| 2014/0327628 A1* | 11/2014 | Tijssen | G06F 3/0484 345/173 |
| 2015/0268812 A1* | 9/2015 | Walline | G06F 1/1601 715/773 |

FOREIGN PATENT DOCUMENTS

| | | | | |
|---|---|---|---|---|
| WO | WO-2013019217 | | 2/2013 | |
| WO | WO-2013019255 A1 * | | 2/2013 | ........... G03B 21/132 |

OTHER PUBLICATIONS

Shahram Izadi et al., "C-Slate: A Multi-Touch and Object Recognition System for Remote Collaboration using Horizontal Surface," 2007, pp. 3-10, IEEE.

* cited by examiner

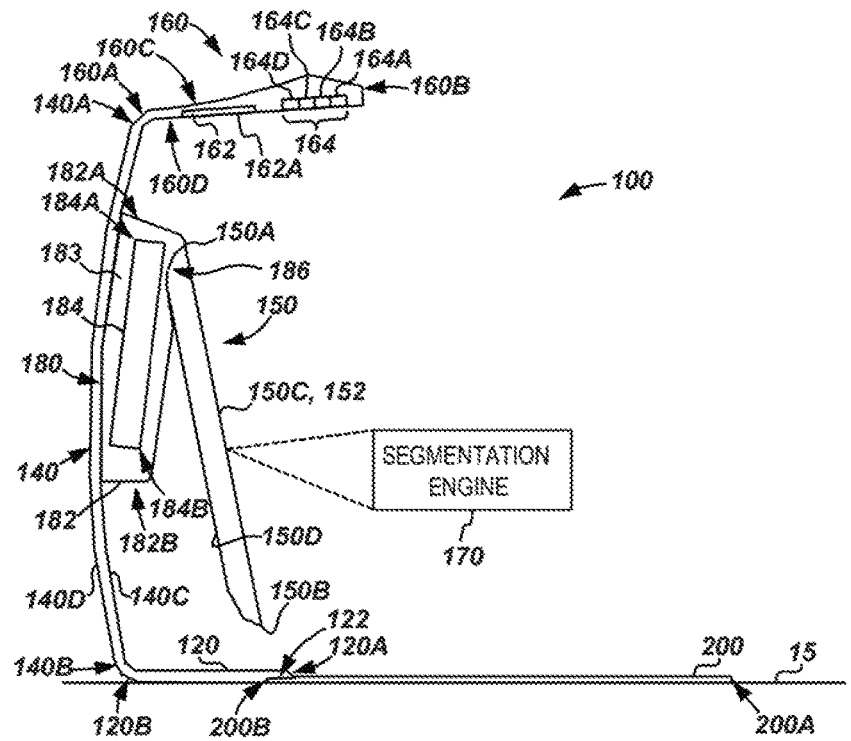

# US 10,444,894 B2

DEVELOPING CONTEXTUAL INFORMATION FROM AN IMAGE

BACKGROUND

Many computing systems include at least one display and at least one input device. The display may include for example, a monitor, a screen, or the like. Example input devices include a mouse, a keyboard, a touchpad, or the like. Some computing systems include a touch-sensitive display to both display output of the computing system and receive physical (e.g., touch) input.

BRIEF DESCRIPTION OF THE DRAWINGS

The following detailed description references the drawings, wherein;

FIG. 3 is a schematic side view of the example computing system of FIG. 1;

FIG. 4 is a schematic front of the example computing system of FIG. 1;

DETAILED DESCRIPTION

Figure 1:
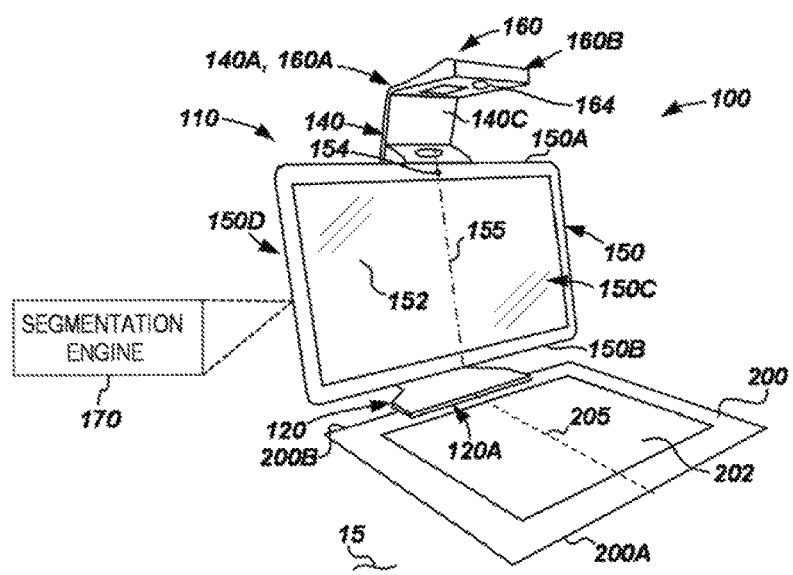
FIG. 1 is perspective view of an example computing system.

Referring now to the drawings, FIGS. 1-6 are schematic views of an example computing system 100 comprising a segmentation engine 170. In some examples, segmentation engine 170 may determine a segmentation boundary representing at least one outer edge of an object based on a captured image, as will be further described. In the example of FIGS. 1-6, system 100 generally comprises a support structure 110, a computing device 150, a projector unit 180, and a projection screen 200.

Computing device 150 may comprise any suitable computing device complying with the principles disclosed herein. As used herein, a "computing device" may comprise an electronic display device, a smartphone, a tablet, a chip set, an all-in-one computer (e.g., a device comprising a display device that also houses processing resource(s) of the computer), a desktop computer, a notebook computer, workstation, server, any other processing device or equipment, or a combination thereof, in this example, device 150 is an all-in-one computer having a central axis or center line 155, first or top side 150A, a second or bottom side 150B axially opposite the top side 150A, a front side 150C extending axially between sides 150A and 150B, a rear side 150D also extending axially between sides 150A and 150B and generally radially opposite front side 150C. A display 152 is disposed along front side 150C and defines a viewing surface of computing system 100 to display images for viewing by a user of system 100. In examples described herein, a display may include components of any technology suitable for displaying images, video, or the like.

In some examples, display 152 may be a touch-sensitive display. In examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture images of a user positioned in front of display 152. In some examples, device 150 may also include a microphone or other device to receive sound input (e.g., voice input from a user).

Figure 2:
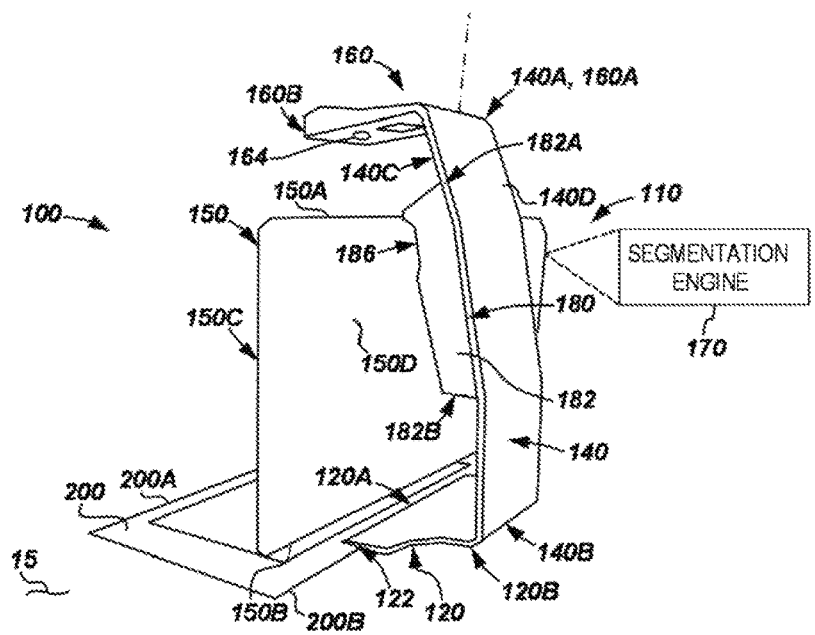
FIG. 2 is another schematic perspective view of the example computing system of FIG. 1.

In the example, of FIGS. 1-6, support structure 110 includes a base 120, an upright member 140, and a top 160. Base 120 includes a first or front end 120A, and a second or rear end 120B. Base 120 may engage with a support surface 15 to support the weight of at least a portion of the components of system 100 (e.g., member 140, unit 100, device 150, top 160, etc.). In some examples, base 120 may engage with support surface 15 in this manner when system 100 is configured for operation. In the example of FIGS. 1-6, front end 120A of base 120 includes a raised portion 122 that may be disposed above and separated from support surface 15 (creating a space or clearance between portion 122 and surface 15) when base 120 is disposed on support surface 15 as illustrated in FIG. 2, for example. In such examples, a portion of a side of projection screen 200 may be disposed in (e.g., received within) the space formed between portion 122 and surface 15. In such examples, piecing a portion of screen 200 within the space created by portion 122 and surface 15 may assist with the proper alignment of screen 200. In other examples, other suitable methods or devices may be used to assist with the alignment of screen 200.

Upright member 140 includes a first or upper end 140A, a second or lower end 140B opposite the upper end 140A, a first or front side 140C extending between the ends 140A and 140B, and a second or rear side 140D opposite the front side 140C and also extending between the ends 140A and 140B. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 1608 extends outward from, upper end 140A of upright member 140. As such, in the example shown in FIG. 2, top 160 is supported at end 160A (and not at and 160B), and may be referred to herein as a cantilevered top. In some examples, base 120, member 140, and top 160 may be monolithically formed. In other examples, two or more of base 120, member 140, and top 160 may be formed of separate pieces (i.e., not monolithically formed).

Projection screen 200 may include a central axis or centerline 20 first or front side 200A, and a second or rear, side 200B axially opposite the front side 200A. In the example of FIGS. 1-6, screen 200 may comprise a touch-sensitive region 202 substantially aligned with axis 205. Region 202 may comprise any suitable technology for detecting physical contact touch (e.g., touch input), as described above (e.g., capacitive touch mat). For example, touch-sensitive region 202 may comprise any suitable technology for detecting (and in some examples tracking) one or multiple touch inputs by a user to enable the user to interact, via such touch input, with software being executed by device 150 or another computing device. In the example of FIGS. 1-6, region 202 extends over less than all of screen 200. In other examples, region 202 may extend over substantially all of screen 200 (e.g., may be substantially coterminous with screen 200). In examples described herein, projection screen 200 may be any suitable planar object such as a mat (e.g., a touch-sensitive mat), tabletop, sheet, etc. In some examples, projection screen 200 may be disposed horizontal (or approximately or substantially horizontal). For example, screen 200 may be disposed on support surface 15, which may be horizontal (or approximately or substantially horizontal).

As described above, screen 200 may be aligned with base 120 of structure 110 to assist with proper alignment of screen 200 (e.g., at least during operation of system 100). In the example of FIGS. 1-6, rear side 200B of screen 200 may be disposed between raised portion 122 of base end support surface 15, such that rear end 200B is aligned with front side 120A of base 120 to assist with proper overall alignment of screen 200 (and particularly proper alignment of region 202) with other components of system 100. In some examples, screen 200 may be aligned with device 150 such that the center line 155 of device 150 is substantially aligned with center line 205 of screen 200. In other examples, screen 200 may be differently aligned with, device 150.

In some examples, region 202 of screen 200 and device 150 may be communicatively connected (e.g., electrically coupled) to one another such that user inputs received by region 202 may be communicated to device 150. Region 202 and device 150 may communicate with one another via any suitable wired or wireless communication technology or mechanism, such as, for example, WI-FI, BLUETOOTH, ultrasonic technology, electrical cables, electrical leads, electrical conductors, electrical spring-loaded pogo pins with magnetic holding force, or the like, or a combination thereof. In the examples of FIGS. 1-6, exposed electrical contacts disposed on rear side 200B of screen 200 may engage with corresponding electrical pogo-pin leads within portion 122 of base 120 to communicate information (e.g., transfer signals) between device 150 and region 202 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of screen 200.

Referring to FIG. 3, projector unit 180 comprises an outer housing 182, and a projector assembly 184 disposed within housing 182. Housing 182 includes a first or upper end 182A, a second or lower end 182B opposite the upper end 182A, and en inner cavity 183. In the example of FIG. 3, housing 182 further includes a coupling, or mounting member 186 to engage with and support device 150 (e.g., at least during operation of system 100). Member 186 may be any suitable mechanism or device for suspending and supporting any suitable computing device 150 as described herein. For example, member 186 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of unit 180. In some examples, housing 180 and device 150 may be integrally or monolithically formed as a single unit.

Referring to FIG. 4, in some examples, when device 160 is suspended from structure 110 via mounting member 186 on housing 182, projector unit 180 (i.e., both housing 182 and assembly 184) may be substantially hidden behind device 150 when system 100 is viewed from the front (i.e., substantially facing display 152 disposed on front side 150C of device 150). In addition, as shown in FIG. 4, when device 150 is suspended from structure 110 as described above, projector unit 180 (i.e., both housing 182 and assembly 184) and any image projected thereby may be substantially aligned or centered with respect to center line 155 of device 150.

Referring again to FIG. 3, projector assembly 184 is disposed within cavity 183 of housing 182, and includes a first, or upper end 184A, a second or lower end 184B opposite the upper end 184A. Upper end 184B is proximate upper end 182A of housing 182 while tower end 184B is proximate lower end 182B of housing 182. Projector assembly 184 may comprise any suitable digital light projector assembly for receiving data from a computing device (e.g., device 150) and projecting image(s) (e.g., out of upper end 184A) that correspond with that input data. For example, in some implementations, projector assembly 184 may comprise a digital light processing (DLP) projector or a liquid crystal on silicon (LCoS) projector which are advantageously compact and power efficient projection engines capable of multiple display resolutions and sizes, such as, for example, standard XGA resolution (1024×768 pixels) with a 4:3 aspect ratio, or standard WXGA resolution (1280×800 pixels) with a 16:10 aspect ratio. Projector assembly 184 is further communicatively connected (e.g., electrically coupled) to device 160 in order to receive data therefrom and to produce (e.g., project) light and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, optical connection, an ultrasonic connection, or a combination thereof. In the example of FIGS. 1-6, device 150 is communicatively connected to assembly 184 through electrical leads or conductors (e.g., as described above in relation to screen 200 and base 120) disposed within mounting member 186 such that, when device 150 is suspended from structure 110 through member 186, the electrical leads disposed within member 166 contact corresponding leads or conductors disposed on device 150.

Referring still to FIG. 3, top 160 further includes a fold mirror 162 and a sensor bundle 164. Mirror 162 includes a highly reflective surface 162A that is disposed along bottom surface 160D of top 160 and is positioned to reflect light, image(s), etc., projected from upper end 184A of projector assembly 184 toward screen 200 during operation. Mirror 162 may comprise any suitable type of mirror or reflective surface. In the example of FIGS. 1-6, fold mirror 162 may comprise a standard front surface vacuum metalized aluminum coated glass mirror that acts to fold light emitted from assembly 194 down to screen 200. In other examples, mirror 162 may have a complex aspherical curvature to act as a reflective lens element to provide additional focusing power or optical correction.

Sensor bundle 164 includes a plurality of sensors (e.g., cameras, or other types of sensors) to detect, measure, or otherwise acquire data based on the state of (e.g., activities occurring in) a region between sensor bundle 164 and screen 200. The state of the region between sensor bundle 164 and screen 200 may include object(s) on or over screen 200, or activities) occurring on or near screen 200. In the example of FIG. 3, bundle 164 includes an RGB camera 164A for another type of odor camera 164A) an IR camera 164B, a depth camera (or depth sensor) 164C, and an ambient light sensor 164D.

In some examples, RGB camera 164A may be a camera to capture color images (e.g., at least one of still images and video). In some examples, RGB camera 164A may be a camera to capture images according to the RGB color model, which may be referred to herein as "RGB images". In some examples, RGB camera 164A may capture images with relatively high resolution, such as a resolution on the order of multiple megapixels (MPs), for example. As an example, RGB camera 164A may capture color (e.g., RGB) images with a resolution of 14 MPs. In other examples, RBG camera 164A may capture images with a different resolution. In some examples, RGB camera 164A may be pointed toward screen 200 and may capture image(s) of screen 200, object(s) disposed between screen 200 and RGB camera 164A (e.g., on or above screen 200), or a combination thereof.

IR camera 164B may be a camera to detect intensity of IR light a plurality of points in the field of view of the camera 164B. In examples described herein, IR camera 164B may operate in conjunction with an IR light projector of system 100 to capture IR images. In such examples, each IR image may comprise a plurality of pixels each representing an intensity of IR light detected at a point represented by the pixel. In some examples, top 160 of system 100 may include an IR light projector to project IR light toward screen 200 and IR camera 164B may be pointed toward screen 200. In such examples, IR camera 164B may detect the intensity of IR light reflected by screen 200, object(s) disposed between screen 200 and IR camera 164B (e.g., on or above screen 200), or a combination thereof. In some examples, IR camera 164B may exclusively detect IR light projected by IR light projector (e.g., as reflected from screen 200, object(s), etc., or received directly).

Depth camera 164C may be a camera (sensor(s), etc.) to detect the respective distance(s) (or depth(s)) of portions of object(s) in the field of view of depth camera 164C. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth measured from camera 164C) of a portion of an object at a point represented by the pixel. Depth camera 164C may be implemented using any suitable technology, such as stereovision camera(s), a single IR camera sensor with a uniform flood of IR light, a dual IR camera sensor with a uniform flood of IR light, structured light depth sensor technology, time-of-flight (TOF) depth sensor technology, or a combination thereof. In some examples, depth sensor 164C may indicate when en object (e.g., a three-dimensional object) is on screen 200. In some examples, depth sensor 164C may detect at least one of the presence, shape, contours, motion, and the respective distance(s) of an object (or portions thereof) placed on screen 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) (e.g., sensor(s), camera(s)) for tracking a user input device such as, for example, a hand, stylus, pointing device, etc. In some examples, the user interface sensor may include a pair of cameras which are arranged to stereoscopically track the location of a user input device (e.g., a stylus) as it is moved by a user about the screen 200 (e.g., about region 202 of screen 200). In other examples, the user interface sensor may additionally or alternatively include IR camera(s) or sensor(s) arranged to detect infrared light that is either emitted or reflected by a user input device.

In examples described herein, each of sensors 164A-164D of bundle 164 is communicatively connected (e.g., coupled) to device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIGS. 1-6, electrical conductors may be routed from bundle 164 through top 160, upright member 140, and projector unit 180 and into device 150 through leads that are disposed within mounting member 186 (as described above).

Figure 5:
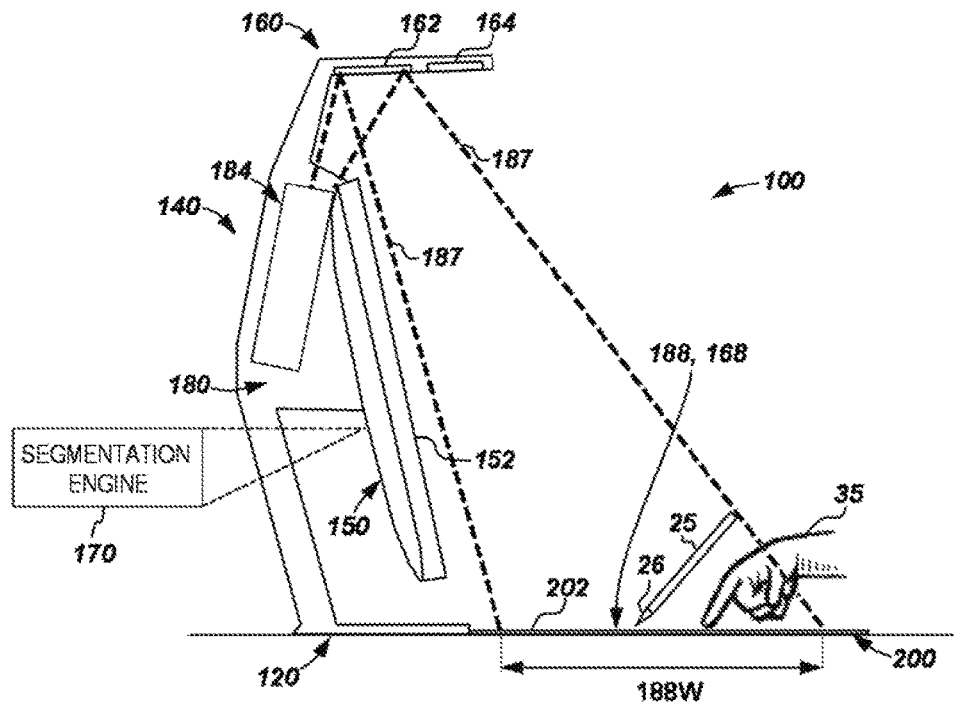
FIG. 5 is a schematic side view of the example computing system of FIG. 1 during an example operation.
Figure 6:
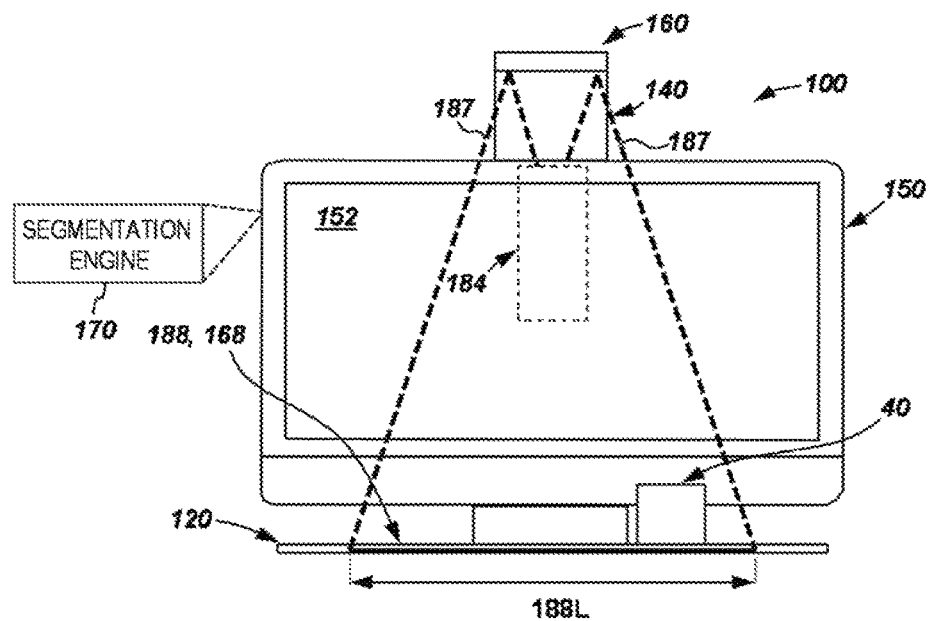
FIG. 6 is a schematic front view of the computing system of FIG. 1 during an example operation.

Referring to FIGS. 5 and 6, during operation of system 100, projector assembly 184 may project visible light 187 to reflect off of mirror 162 towards screen 200 to thereby display visible image(s) on a projector display space 188 of screen 200. In the example of FIGS. 5-6, space 188 may be substantially rectangular, having a length 188L and a width 188W. In some examples, length 188L may be approximately 16 inches, while width 188W may be approximately 12 inches. In other examples, length 188L and width 188W may have different values.

In some examples, cameras 164A-164C of sensor bundle 164 are arranged within system 100 such that the field of view of each of cameras 164A-164C includes a space 168 of screen 200 that may overlap with some or all of display space 188 or may be coterminous with display space 188. In examples described herein, the field of view of cameras 164A-164C may be said to include space 168, though at times screen 200 may be at least partially occluded by object(s) on or over screen 200. In such examples, the object(s) on or over screen 200 may be in the field of view of at least one of cameras 164A-164C. In such examples, sensors of sensor bundle 164 may acquire data based on the state of (e.g., activities occurring in, object(s) disposed in) a region between sensor bundle 164 and space 168 of screen 200. In some examples, both space 188 and space 168 coincide or correspond with region 202 of screen 200 such that functionalities of touch sensitive region 202, projector assembly 184, and sensor bundle 164 are ail performed in relation to the same defined area.

Referring now to FIGS. 5-6, device 150 may direct projector assembly 184 to project image(s) onto region 202 of screen 200. Device 150 may also display image(s) on display 152 (which may be the same as or different from the image(s) projected onto region 202 by projector assembly 184). The image(s) projected by assembly 184 may comprise information and/or images produced by software being executed by device 150. In some examples, a user may interact with the image(s) projected on region 202 and displayed on display 152 by physically engaging the touch-sensitive region 202 of screen 200 in any suitable manner, such as with users hard 35 (e.g., via touches, taps, gestures, or other touch input), with a stylus 25, or via any other suitable user input device(s). Touch-sensitive region 202 may detect such interaction via physical engagement with region 202. Also, in some examples, assembly 184 may also project image(s) (at least partially) on objects disposed over screen 200 (e.g., hand 35, as shown in FIG. 5).

As an example, when a user interacts with region 202 of screen 200 (e.g., with a hand 35, as shown in FIG. 5), touch-sensitive region 202 may generate touch input information and provide it to device 150 through any suitable connection (examples of which are described above). In some examples, the touch input information may be provided to an operating system (OS) executing on device 150, and may further be passed by to OS to another application (e.g., program, etc.) executing on device 150. In response, the executing OS or application may alter image(s) projected by projector assembly 184, image(s) displayed on display 152, or a combination thereof. As used herein, an "application" (or "computer application") is a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.). In some examples, region 202 (with image(s) projected on it by assembly 184) may serve as a second or alternative touch-sensitive display within system 100. In addition, detection of interaction with image(s) displayed on region 202 may be enhanced through use of sensors of sensor bundle 164 as described above.

In some examples, sensors of sensor bundle 164 may also generate system input that, may be provided to device 150 for further processing. For example, system 100 may utilize at least sensor(s) (or cameras) of bundle 164 and segmentation engine 170 detect at least one of the presence and location of an object (e.g., a user's hand 35 or a stylus 25, as shown in FIG. 5), and provide system input information representing the detected information to device 150. The provided system input information may be passed to at least one of an OS and application being executed by device 150, and may alter image(s) displayed by system 100, as described above in relation to touch input. For example, bundle 164 may include a pair of cameras or sensors are arranged to perform stereoscopic stylus tracking (e.g., of stylus 25). In other examples, stylus 25 includes a tip 26 coated with an infrared retro-reflective coating (e.g., paint) such that tip 26 may serve as an infrared retro-reflector. In such examples, bundle 164 may include IR camera(s) (or sensor(s)), as described above, which detect IR light that is reflected off of tip 26 to enable device 150 to track the location of tip 26 as it moves across region 202.

In some examples, system 100 capture two-dimension (2D) image(s) or create a three-dimensional (3D) scan of a physical object such that an image of the object or other information related to the object may then be projected onto region 202 for further use and manipulation thereof. For example, as shown in FIG. 6, an object 40 may be placed on region 202 such that sensors of bundle 164 (e.g., at least one of cameras 164A-164C) may capture an image of the object 40. In such examples, the image captured by the sensors of bundle 164 may be provided to device 150 (e.g., an OS, application, etc.), as described above. In some examples, after receiving the captured image, device 150 (e.g., the OS, application, etc.) may analyze the captured image and utilize content of the image for further processing, as will be further described. Object 40 may be, for example, a book, a document, a photo, or any other physical object.

In some examples, once object(s) are scanned by sensors of bundle 164, the background of the image representing the object may be removed (e.g., via a segmentation process), and the resulting image of the foreground object, or information related to the object, may be projected onto region 202 (or shown on display 152). In such examples, images of physical objects (e.g., object 40) may be captured, processed, and displayed on region 202 to quickly and easily create a digital version of the physical object to allow for further manipulation thereof, as will be further described. The background of the image representing the object 40 that is removed may correspond to at least a portion of the screen 200. In some examples, a segmentation process may comprise determining a segmentation boundary for an object represented in the image captured by the sensors of bundle 164A. As used herein, a "segmentation boundary" for an object represented in an image may be information representing an estimate of which portion(s) of the image represent the object and which portion(s) of the image represent features other than the object, such as the projection screen 200. In some examples, a segmentation boundary for an object represented in an image may include information representing at least one outer edge of the object as represented in the image. When performing a segmentation process, the system 100 may use the segmentation boundary to extract an image of the object from a larger captured image including, at least, a portion of the projection screen 200.

Examples disclosed herein provide the ability for the computing system 100 to provide contextual and meaningful information for data included or entered on the projection screen 200 or on an object physically disposed on the screen 200. By providing contextual and meaningful information, the system 100 may provide interactive feedback to a user. With the ability to display and collect information via the display 152 of the computing device 150 and/or the region 202 of the projection screen 200, and the ability to collect information from physical objects disposed on the screen 200 (e.g., via sensor bundle 164), the various aspects of the computing system 100 may provide an interactive experience for a user, as will be further described.

As described above, a user may interact with system 100 in various ways. As an example, a user may interact with images projected on region 202 of the projection screen 200, for example, with the user's hand 35 or a stylus 25. In addition, the sensor bundle 164 may capture images of physical objects disposed on the projection screen 200, such as a page from a book disposed on the screen 200. As an example, the computing system 100 may provide contextual information for data or original material from the images projected on region 202 (or displayed on display 152) or from the object physically disposed on the screen 200. As an example, the system 100 may automatically try to understand the original material (e.g., extracting keywords, characters, numbers, or strings), or the user may select a portion from the original material that requires understanding, as will be further described. Examples of contextual information that the system 100 may provide include, but are not limited to, dictionary definitions of keywords from the original material, language translations, videos regarding a keyword or phrase from the original material, and results of a math equation extracted from the original material.

The contextual formation may be projected onto the screen or to the object. As the contextual information is provided by the system 100 as supplemental information for the user, it may not be desirable to distract the user with the contextual information unless the user chooses to view the contextual information. As an example, the system 100 may project visual cues indicating that there is contextual information regarding the original material that is projected on region 202 or from the object physically disposed on the screen 200. As a result, the user may select the visual cue when it is appropriate or convenient to view the contextual information.

Figure 7:
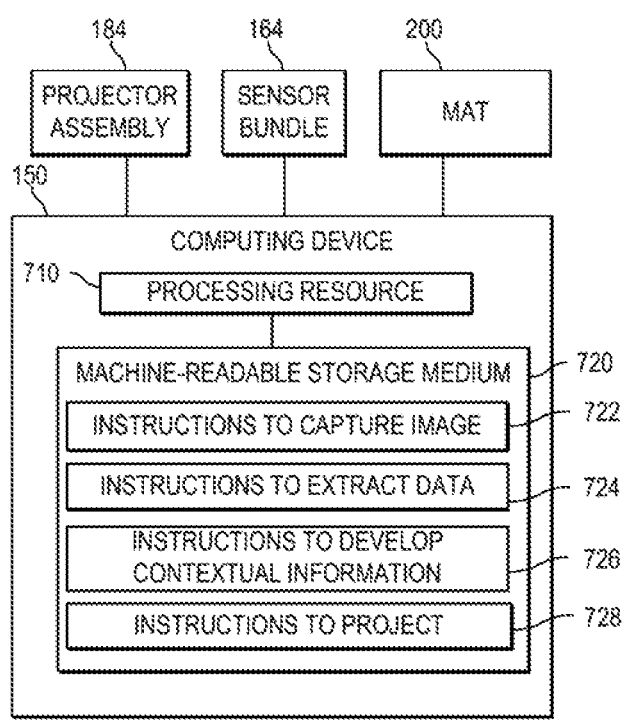
FIG. 7 is a block diagram of an example portion, of the computing system of FIG. 1.

FIG. 7 is a block diagram of a portion of computing system 100 of FIG. 1 comprising segmentation engine 170. In particular, FIG. 7 illustrates an example of imputing device 150 that comprises segmentation engine 170 and is communicatively connected to projector assembly 184, sensor bundle 164, and projection screen 200 or touch sensitive mat (as described above). Although not shown in FIG. 7, computing device 150 may also be communicatively connected to other components of system 100, as described above.

Computing device 150 (or any other computing device implementing segmentation engine 170) may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (CPU), a field-programmable gate array (FPGA) configured to retrieve and execute instructions, other electronic circuitry suitable for the retrieval and execution instructions stored on a machine-readable storage medium, or a combination thereof.

Referring to FIG. 7, the computing device 150 includes a processing resource 710, and a machine-readable storage medium 720 comprising (e.g., encoded with) instructions 722, 724, 726, and 728. In some examples, storage medium 720 may include additional instructions. In other examples, instructions 722, 724, 726, 728, and any other instructions described herein in relation to storage medium 720, may be stored on a machine-readable storage medium remote from but accessible to computing device 150 and processing resource 710. Processing resource 710 may fetch, decode, and execute instructions stored on storage medium 720 to implement the functionalities described below. In other examples, the functionalities of any of the instructions of storage medium 720 may be implemented in the form of electronic circuitry, in the form of executable instructions encoded on a machine-readable storage medium, or a combination thereof. Machine-readable storage medium 720 may be a non-transitory machine-readable storage medium.

In some examples, the instructions can be part of an installation package that, when installed, can be executed by the processing resource 710. In such examples, the machine-readable storage medium may b a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic optical, or other physical storage apparatus to contain or store information such as executable instructions, data, and the like. For example, any machine-readable storage medium described herein may be any of a storage drive (e.g., a hard drive), flash memory. Random Access Memory (RAM), any type of storage disc (e.g., a compact disc, a DVD, etc.), and the like, or a combination thereof. Further any machine-readable storage medium described herein may be non-transitory.

In the example of FIG. 7, a computing system, such as computing system 100 described above in relation to FIG. 1 may comprise computing device 150, projector assembly 184, sensor bundle 164, and projection screen 200 (e.g., touch sensitive mat). In some examples, instructions 722 may include instructions for capturing an image of data included or entered on the touch sensitive mat 200 or on an object physically disposed on the mat 200. For data included or entered on the mat 200 may be captured by the mat 200 itself. Data included on the mat 200 may correspond to data projected onto the mat from the projector assembly 184. For data entered on the mat 200 data may be entered (e.g., handwritten) on the touch-sensitive region 202 of screen 200 in any suitable manner, such as with user's hand 35, with a stylus 25, or via any other suitable user input device. As a result the mat 200 may capture an image of data entered on the mat 200 in real-time.

For data entered or included on an object physically disposed on the mat 200 (e.g., object 40), the sensor bundle 164 disposed above the mat 200 may capture an image of the data on the object. As an example, in order to properly capture an image of the data on the object disposed on the mat 200, the object may be placed in space 168, which corresponds to the field of view of the sensor bundle 164 (e.g., see FIG. 6). As described above, both space 188 and space 168 may coincide or correspond with region 202 of screen 200 sum that functionalities of touch sensitive region 202, projector assembly 184, and sensor, bundle 164 are all performed in relation to the same defined area. In addition to the sensor bundle 164, the system 100 may utilize the segmentation engine 170 to determine a segmentation boundary for the object represented in the image captured by the sensor bundle 164, in order to properly capture the data on the object.

Instructions 724 may include instructions for extracting the data from the captured image. As an example, for an object disposed on the mat 200, such as a page from a book, characters from the captured image of the page may be extracted, and the extracted characters may be converted into machine-readable characters, which can be understood by the system 100 in order to provide contextual information, as will be further described. Examples of characters that may be extracted from the captured image include, but are not limited to, text, numbers, strings, and mathematical expressions. Prior to extracting data or characters from the captured image, the system 100 may perform pre-processing techniques on the captured image, in order to improve the accuracy of successful character recognition. Examples of pre-processing techniques include, but are not limited to, de-skewing the captured image in order to make lines of text (or characters) more horizontal or vertical, binarization of the captured image, line and word detection, layout analysis, etc. As an example, a technique for converting the extracted characters to machine-readable characters includes optical character recognition (OCR). OCR utilizes algorithms that may involve pattern matching of characters/glyph at the pixel level or comparing extracted features from a glyph with a vector like representation of a character.

As an example, in addition to extra citing the data from the captured image, the system 100 may collect metadata associated with the extracted data. The metadata may include positioning of the extracted data on the mat 200 or on the object physically disposed on the mat 200 (e.g., x and y coordinates of the extracted data). The metadata associated with the extracted data may be helpful in determining the contextual information that is developed by the system 100, as will be further described.

Instructions 726 may include instructions for developing contextual information from the data extracted from the captured image. Developing the contextual information may involve analyzing and understanding the extracted data, in order to provide meaningful information to a user. Examples of contextual information include, but are not limited to, dictionary definitions, language translations, various multimedia content, such as videos from the Internet, and results of a math equation extracted from the captured image. As an example, the system 100 may automatically attempt to develop the contextual information from the data extracted from the captured image by obtaining keywords, characters, numbers, or strings from the extracted data. However, in an effort to produce contextual information that is relevant for a user, the user may select a portion from the extracted data for the system 100 to develop the contextual information. As an example, the user may select the portion by making a selection of the data on the touch sensitive mat 200 or on the object physically disposed on the mat 200. The user may select the portion for developing contextual information by using the user's hand 35, a stylus 25, or any other suitable user input device. If the selection of the data is data projected onto the mat 200, the mat 200 itself may detect the selection made by the user, according to an example. However, if the selection of data is data included on the object (e.g., object 40), the sensor bundle 164 may detect the selection made by the user.

As described above, the system 100 may collect metadata associated with the extracted data, which includes positioning of the extracted data on the mat 200 or on the object. The selection made by the user for developing the contextual information may correspond to the metadata associated with the extracted data. For example, the x and y positioning of the selection made by the user may correspond to the x and y positioning portion of the extracted data on the mat 200 or on the object (e.g., object 40). Based on the selection made by the user, the system 100 may determine which text or characters to select in order to understand and build context information from the selection.

When the user selects a single item (e.g., a word or mathematical expression), the system 100 may build contextual information based on the selection. However, when the user makes a broader selection, such as a phrase or a whole passage, the system 100 may need to build an understanding of the selection based on natural language processing algorithms, as an example. These algorithms, as an example, rely on machine learning through the analysis of real-world textual data sets. Using these algorithms to process the selection made by the user, the system 100 can build context information from keywords, related concepts or topics, speech tagging (e.g., for identification of verbs, nouns, etc.), text to speech, etc.

Once the contextual information is developed, instructions 728 may include instructions for projecting the contextual information onto the touch sensitive mat 200 or onto the object physically disposed on the touch sensitive mat 200. As the contextual information is provided by the system 100 as supplemental information for the user, it may not be desirable to distract the user with the contextual information unless the user chooses to view the contextual information. As an example, the system 100 may project visual cues indicating that there is contextual information regarding the original data that was included or entered on mat 200 or from the object physically disposed on the mat 200. As a result, the user may select the visual cue when it is appropriate or convenient to view the contextual information. As an example, if the visual cue is projected onto the mat 200, the met 200 itself may detect when the visual cue is selected by the user. However, if the visual cue is projected onto the object (e.g., object 40), the sensor bundle 164 may detect the visual cue is selected by the user. As an example, the visual we may be projected on an area of the mat 200 or object that will not distract the user from the original data.

Figure 8:
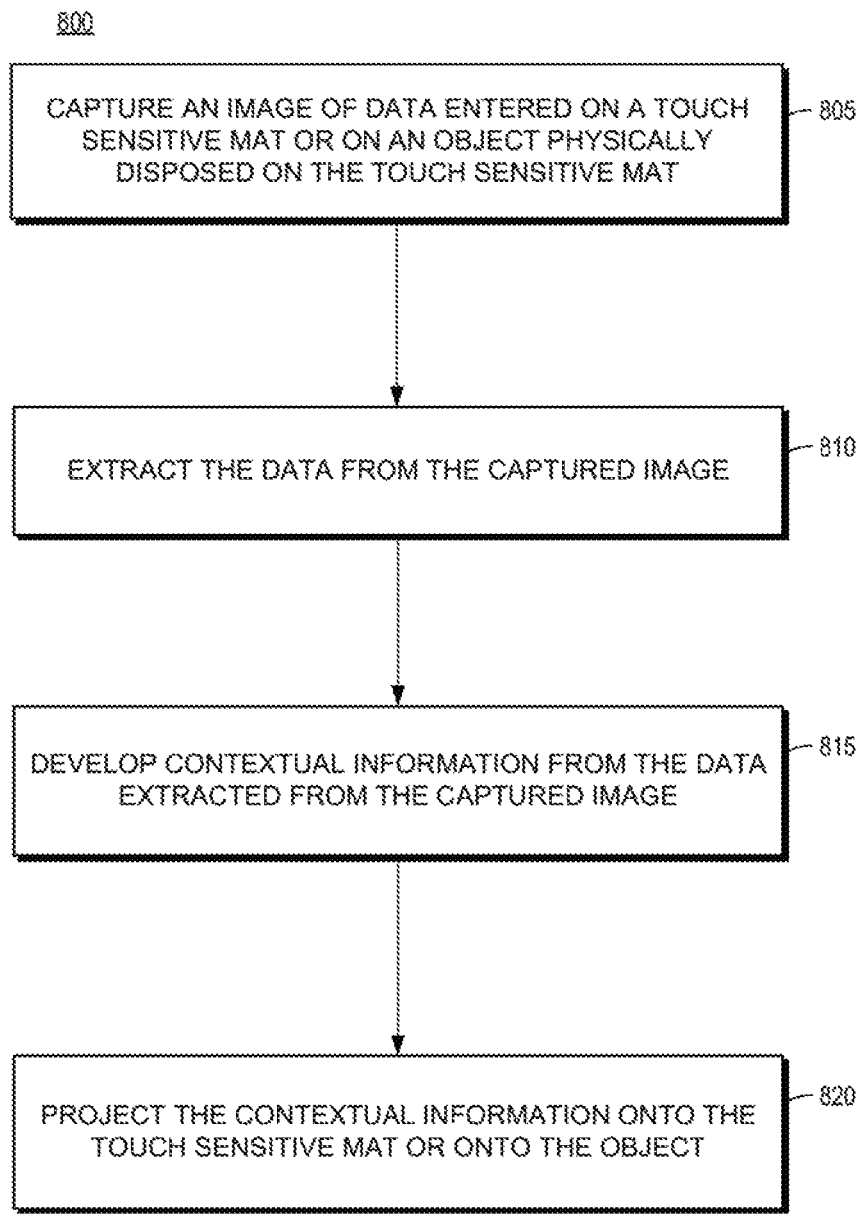
FIG. 8 is a flow diagram depicting steps to implement an example.

FIG. 8 is a flowchart of an example method 800 for developing contextual information and projecting the contextual information. Although execution of method 800 is described below with reference to computing system 100 of FIG. 1, other suitable systems for execution of method 800 can be utilized. Additionally, implementation of method 800 is not limited to such examples.

At 805 of method 800, system 100 may capture an image of data entered on a touch sensitive mat (e.g., touch-sensitive region 202 of projection screen 200) or on an object physically disposed on the touch sensitive mat (e.g., object 40). As an example, the system 100 may use the mat itself to capture the image of data entered on the mat, and may use the sensor bundle 164 to capture the usage data entered on the object.

At 810, the system 100 may extract the data from the captured image. As an example, extracting the data may include extracting characters from the captured image, and converting the extracted characters into machine-readable characters. Examples of characters that may be extracted from the captured image include, but are not limited to, text numbers, strings, and mathematical expressions. In addition to extracting the data, the system 100 may collect metadata associated with the extracted data. As an example, the metadata may include positioning of the extracted data on the touch sensitive mat or on the object.

At 815, the system 100 may develop contextual information from the data extracted from the captured image. As an example, the system 100 may automatically attempt to develop the contextual information from the data extracted from the captured image by obtaining keywords, characters, numbers, or strings from the extracted data. As an example, the contextual information may be developed based on a selection of the data made by the user on the touch sensitive mat or on the object. If the selection of the data is data projected onto the mat, the mat itself may detect the selection made by the user, according to an example. However, if the selection of data is data included on the object (e.g., object 40), the sensor bundle 164 may detect the selection made by the user. As an example, a positioning of the selection of the data on the mat or on the object may correspond to the metadata associated with the extracted data.

At 820, the system 100 may project the contextual information (e.g., via projector assembly 184) onto the touch sensitive mat or onto the object. As an example, the system 100 may project visual cues indicating that there is contextual information regarding the original data that was included or entered on mat or from the object physically disposed on the mat. As a result, the user may select the visual cue when it is appropriate or convenient to view the contextual information.

Although the flowchart of FIG. 8 shows a specific order of performance of certain functionalities, method 800 is not limited to that order. For example, the functionalities shown in succession in the flowchart may be performed in a different order, may be executed concurrently or with partial concurrence, or a combination thereof. In some examples, features and functionalities described herein in relation to FIG. 8 may be provided in combination with features and functionalities described herein in relation to any of FIGS. 1-7.

What is claimed is:

1. A method for operating a system comprising a touch sensitive mat, a projector assembly to project images on to the touch sensitive mat, a computing device attached to the projector assembly, and a plurality of sensors disposed above and pointed at the touch sensitive mat, the method comprising:
   capturing, by a plurality of sensors, an image of data entered on an object physically disposed on the touch sensitive mat;
   determining, by a processor of the computing device, a boundary for the object represented in the captured image and use the boundary for the object to extract an image of the object and the data on the object;
   developing, by the processor, contextual information from the data extracted from the captured image; and
   projecting, by the projector assembly, the contextual information onto the object disposed on the touch sensitive mat.

2. The method of claim 1, comprising:
   collecting metadata associated with the extracted data, wherein the metadata comprises positioning of the extracted data on the touch sensitive mat or on the object.

3. The method of claim 2, wherein the contextual information is developed based on a selection of the data made by a user on the touch sensitive mat or on the object.

4. The method of claim 3, wherein a positioning of the selection of the data on the touch sensitive mat or on the object corresponds to the metadata associated with the extracted data.

5. The method of claim 1, wherein extracting the data comprises:
   extracting characters from the captured image; and
   converting the extracted characters into machine-readable characters.

6. The method of claim 5, wherein developing the contextual information comprises selecting keywords from the machine-readable characters for developing the contextual information.

7. The method of claim 5, wherein the contextual information is developed based on natural language processing algorithms.

8. The method of claim 1, wherein projecting the contextual information comprises projecting visual cues associated with the contextual information, for a user to choose and interact with the visual cues to present the contextual information when needed.

9. A system, comprising:
   a support structure including a base, an upright member extending upward from the base, and a cantilevered top extending outward from the upright member and including a fold mirror and a plurality of sensors;
   a projector assembly attached to the upright member;
   a computing device attached to the projector assembly; and
   a touch sensitive mat communicatively coupled to the computing device, on to which the projector is to project an image, wherein the projector is to project the image upward to reflect off the mirror and on to the touch sensitive mat, and wherein the computing device is to cause:
      the plurality of sensors to capture an image of data on an object physically disposed on the touch sensitive mat;
      the computing device to determine a boundary for the object represented in the captured image and use the boundary for the object to extract an image of the object and the data on the object;
      the computing device to develop contextual information from the data extracted from the captured image; and
      the projector assembly to project the contextual information onto the object disposed on the touch sensitive mat.

10. The system of claim 9, wherein the computing device is to collect metadata associated with the extracted data, wherein the metadata comprises positioning of the extracted data on the touch sensitive mat or on the object.

11. The system of claim 9, wherein the contextual information is developed based on a selection of the data made by a user on the touch sensitive mat or on the object.

12. The system of claim 11, wherein the selection of the data made by the user on the touch sensitive mat is to be detected by the touch sensitive mat and the selection of the data made by the user on the object is to be detected by the plurality of sensors.

13. A non-transitory machine-readable storage medium comprising instructions executable by a processing resource of a computing device in a system, the system comprising a touch sensitive mat, a projector assembly attached to the computing device to project images on the touch sensitive mat, and a plurality of sensors disposed above and pointed at the touch sensitive mat, the instructions executable to cause:
   the plurality of sensors to capture an image of data entered on an object physically disposed on the touch sensitive mat;
   the processing resource to determine a boundary for the object represented in the captured image and use the boundary for the object to extract an image of the object and the data on the object;
   develop contextual information from the data extracted from the captured image; and
   project the contextual information onto the object disposed on the touch sensitive mat.

14. The storage medium of claim 13, wherein to extract the data, the instructions are to cause the processing resource to:
   extract characters from the captured image; and
   convert the extracted characters into machine-readable characters.

15. The storage medium of claim 14, wherein to develop the contextual information, the instructions are to cause the processing resource to select keywords from the machine-readable characters for developing the contextual information.

* * * * *

UNITED STATES PATENT AND TRADEMARK OFFICE
CERTIFICATE OF CORRECTION

PATENT NO. : 10,444,894 B2
APPLICATION NO. : 15/509805
DATED : October 15, 2019
INVENTOR(S) : Immanuel Amo et al.

It is certified that error appears in the above-identified patent and that said Letters Patent is hereby corrected as shown below:

On the Title Page

In Column 2, item (57), Abstract, Line 2, after "capturing" insert -- an image of --.

Signed and Sealed this
Thirty-first Day of December, 2019

Andrei Iancu
*Director of the United States Patent and Trademark Office*